UNITED STATES PATENT OFFICE.

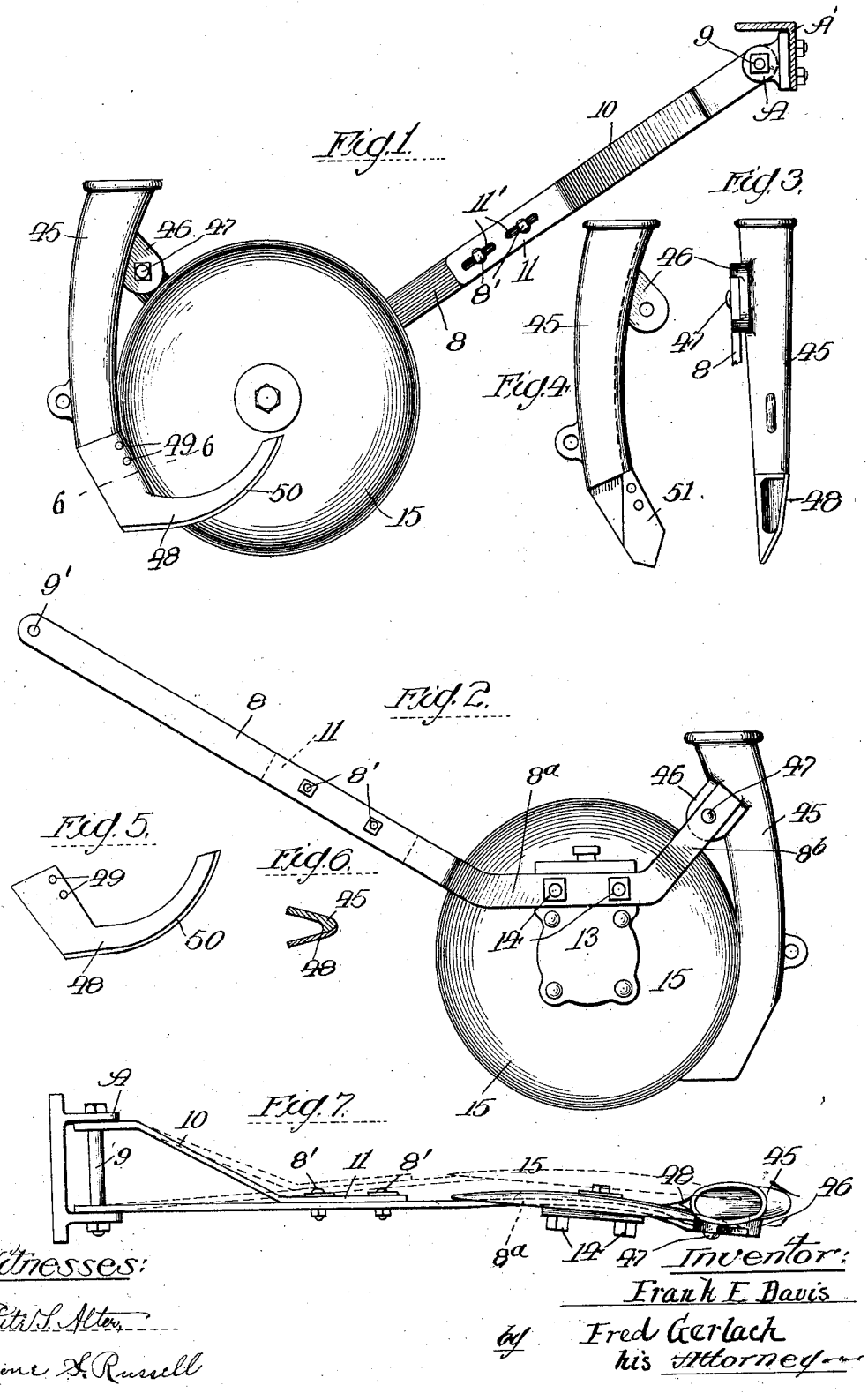

FRANK E. DAVIS, OF LA CROSSE, WISCONSIN.

GRAIN-DRILL.

No. 830,645.

Specification of Letters Patent.

Patented Sept. 11, 1906.

Application filed August 5, 1905. Serial No. 272,807.

*To all whom it may concern:*

Be it known that I, FRANK E. DAVIS, a resident of La Crosse, in the county of La Crosse and State of Wisconsin, have invented certain new and useful Improvements in Grain-Drills, of which the following is a full, clear, and exact description.

The invention relates to grain-drills.

In devices of this class in which disks set at an angle with respect to the line of draft are employed to open a furrow into which the seed is delivered the drag-bar is usually pivotally supported so the openers can be raised out of and lowered into the soil. In practice it has been found that there is material lateral strain on the disks when working in the soil, which frequently tends to displace the disks out of their true and properly-spaced relation. Resultantly the seed is not planted in equidistant rows, which is objectionable. It also occurs at times that the pivotal connection is not accurately made, so that the distal ends of the drag-bars will not be equidistantly spaced when working in the soil, as the result of an imperfect pivotal connection. It also occurs in practice that drag-bars become sprung or bent in transportation, which also causes irregular spacing of the disks.

One object of the invention is to provide in a grain-drill means whereby relative position of the disks can be adjusted to a nicety despite any variation resultant from the causes aforesaid, so that the furrows and rows will be equidistant and properly spaced, and thus overcome the objections aforesaid.

The invention further designs to improve the construction of grain-drills.

The invention consists in the several novel features set forth, and more particularly defined by claims at the conclusion hereof.

In the drawings, Figure 1 is a side elevation of a grain-drill embodying the invention. Fig. 2 is a similar view of the other side. Fig. 3 is a rear view of the seed-boot. Fig. 4 is a detail of the seed-boot, the scouring-plate being removed. Fig. 5 is a detail view of the combined scraper and scouring-plate. Fig. 6 is a section of the seed-conduit taken on line 6 6 of Fig. 1. Fig. 7 is a plan view of the drill.

The drag-bar 8 is provided at its front end with a pivot-hole 9', whereby it can be attached to a pivotal support, such as a bolt 9, secured in a bracket A, secured to a frame-bar A', which support may be of any suitable and well-known construction. The drag-bar comprises also a brace-bar 10, the front end of which is separated from bar 8 so it will be pivotally connected to the support at a point some distance from bar 8 to provide a suitable connection which is adapted to secure the drag-bar against lateral movement. The brace-bar 10 has an offset portion 11, fitting against one side of bar 8, to which it is adjustably connected by slots 11' and bolts 8'. Manifestly when these bolts are loosened drag-bar 8 can be shifted laterally about its pivot to vary the position of the drag-bar and disk carried thereby, as seen in dotted lines, Fig. 7, the bolts and slot connection permitting shift of the brace-bar and drag-bar and serving also to secure the brace-bar and drag-bar together in position to hold the drag-bar at the desired angle.

It will be understood that there is slight play between bolt 9 and the drag and brace bars necessary to permit the adjustment aforesaid. By this adjustable support the line of travel of the angular disk can be varied to rectify any irregularity in spacing of the furrows resulting from any of the causes aforesaid.

The adjustment set forth is for the purpose of adjusting an independent drag-bar—*i. e.*, one which can be adjusted independently of other drag-bars with which a machine may be provided.

A bearing bracket or hanger 13 of any suitable construction is secured to the drag-bar by bolts 14, and in said bearing-bracket 13 a concavo-convex disk 15 is suitably journaled. For the purpose of providing a more compact construction the drag-bar and bracket are arranged on the concave side of the disk and the drag-bar is bent inwardly, as at 8ª, to support the hanger as closely as possible to the disk and to avoid projections which might catch or accumulate trash.

The drag-bar extends rearwardly from the disk-bearing 13 to support a seed-boot 45 adjacent to the rear of the disk at the convex side thereof. The drag-bar is bent upwardly at its rear, as at 8ᵇ, to avoid clogging.

This construction is advantageous, because the seed-boot is firmly supported and directly attached to the rear end of the drag-bar. Furthermore, it provides an advantageous construction in which the disk-hanger is located on the concave side of the disk and is supported by the drag-bar, and the boot on the convex side is directly attached to a rearwardly-extending portion of the drag-bar.

The seed-boot is secured to the drag-bar by a recessed lug 46 integrally formed with the boot and secured to the rear end of the drag-bar by a bolt 47. As well understood in the art, the disk is set at an angle with respect to the line of draft to open a furrow of the desired depth and width. The lower terminal of the boot is positioned to deliver seed into the lowest part or center of the furrow. A blade preferably of polished steel comprises a strip 48, secured to the boot by rivets 49, and a scraper-strip 50 has its lower edge sharpened and bent into contact with the convex face of the disk. Strip 48 forms the outer surface of the lower portion of the boot which travels in the furrow, and being formed of polished steel facilitates passage in the furrow and soil. In other words, the extension constitutes a scouring-blade which effectively prevents the soil from adhering to the boot. Scraper 50 removes the soil that may adhere to the convex side of the disk, which sometimes occurs when working in sticky soil. The lower portion of the boot has its outer side cut away, as at 51, or openly formed, and blade 48 forms the outer side of said portion of the boot, which construction provides a boot the lower end whereof scours in the soil and is made narrow, so it will travel nicely in the furrow. The lower portion of the boot is tapered, (see Fig. 3,) so it will easily travel in the furrow, and rivets 49 are preferably located some distance above the lower end of the boot to avoid extending the rivets through the thinnest portion of the boot.

The invention is not to be understood as restricted to the precise details of construction set forth, since these can be modified without departing from the spirit and scope of the invention.

Having thus described the invention, what I claim as new, and desire to secure by Letters Patent, is—

1. In a grain-drill, the combination of an independent drag-bar pivoted at its front end so it will be free to swing vertically, a furrow-opening disk set at an angle with respect to the line of draft and supported by the rear portion of the drag-bar and means independent of the other drag-bars for angularly adjusting the drag-bar about its front end to vary the angularity of the drag-bar to vary the line of travel.

2. In a grain-drill, the combination of an independent drag-bar, a pivotal connection at its front end which leaves the bar free to swing vertically, a furrow-opener sustained by the rear portion of the drag-bar, and means independent of the other drag-bars for varying the angularity of the drag-bar about the pivot around which the drag-bar swings vertically and whereby the line of travel of the opener can be varied.

3. In a grain-drill, the combination of an independent drag-bar, a pivotal connection at its front end which leaves the bar free to swing vertically, a furrow-opening disk sustained by the rear portion of the drag-bar, and means independent of the other drag-bars for varying the angularity of the drag-bar about the pivot around which the drag-bar swings vertically and whereby the line of travel of the disk may be varied.

4. In a grain-drill, the combination of an independent drag-bar, a fixed support to which the drag-bar is pivotally connected at its front end so it can swing vertically, a furrow-opener sustained by the rear portion of said drag-bar, and an adjustable connection between the drag-bar and the support and independent of the other drag-bars by which the angularity of the drag-bar can be varied to vary the line of travel of the opener.

5. In a grain-drill, the combination of an independent drag-bar, a fixed support to which the drag-bar is pivotally connected at its front and so it can swing vertically, a furrow-opening disk sustained by the rear portion of the drag-bar at an angle with respect to the line of draft, and an adjustable connection between the drag-bar and the support whereby the angularity of the drag-bar can be varied to vary the line of travel of the disk.

6. In a grain-drill, the combination of an independent drag-bar comprising two members laterally disposed with respect to each other, means whereby the drag-bar can be pivotally connected to a support to swing vertically, a furrow-opener sustained by the drag-bar, and means adjustably connecting the members of the drag-bar and whereby the line of travel of the opener can be varied.

7. In a grain-drill, the combination of an independent drag-bar comprising two members laterally disposed with respect to each other, means for pivotally connecting the drag-bar to a support so it will be free to swing vertically, a furrow-opening disk sustained by the drag-bar, and an adjustable connection between the members whereby the drag-bar can be adjusted to vary the line of travel of the opener.

8. In a grain-drill, the combination of a drag-bar, provided with means at its front end whereby it can be pivotally connected to a support to swing vertically, a furrow-opener sustained by the rear portion of the drag-bar, a brace member and an adjustable connection between the brace member and the drag-bar whereby the line of travel of the opener can be varied.

9. In a grain-drill, the combination of a drag-bar provided with means at its front end whereby it can be pivotally connected to a support to swing vertically, a furrow-opening disk sustained by the rear portion of the drag-bar, a brace member, and an adjustable connection between the brace member and the drag-bar whereby the angularity of the drag-bar can be varied to vary the line of travel of the disk.

10. In a grain-drill, the combination of a drag-bar comprising two members adapted to be pivotally connected to a support and adjustably secured so the drag-bar can be adjusted angularly, and a furrow-opener sustained by the drag-bar and whereby the line of travel of the opener can be varied.

11. In a grain-drill, the combination of a drag-bar comprising two members adapted to be pivotally connected to a support and adjustably secured together so the angularity of the drag-bar can be varied, and a furrow-opening disk supported by said drag-bar and whereby the line of travel of the disk can be varied.

12. In a grain-drill, the combination of a drag-bar comprising two members adapted to be pivotally connected to a support, and adjustably secured together so the angularity of the drag-bar can be varied, a furrow-opening disk, and a seed-boot, said disk and boot being supported by said drag-bar.

13. In a grain-drill, the combination of a bar provided with means whereby it can be pivotally connected to a support, a brace also provided with means whereby it can be pivotally connected to a support, an adjustable connection between said brace and said bar whereby the angularity of the bar can be varied, and a furrow-opener sustained by said bar.

14. In a grain-drill, the combination of a bar provided with means whereby it can be pivotally connected to a support, a brace also provided with means whereby it can be pivotally connected to a support, a bolt-and-slot connection between said brace and said bar whereby the angularity of the bar can be varied, a furrow-opener, and a seed-boot sustained by said bar.

15. In a grain-drill, the combination of a concavo-convex disk, a drag-bar whereby the disk is sustained, said drag-bar being arranged at the concave side of the disk and having an integral portion bent into the concavity of the disk, and a seed-boot sustained by said drag-bar.

16. In a grain-drill, the combination of a concavo-convex disk, a bracket in which the disk is journaled, a drag-bar to which said bracket is secured arranged at the concave side of the disk and having an integral portion thereof bent into the concavity of the disk and extended rearwardly of the bracket, and a seed-boot secured to the rear end of said bar.

17. In a grain-drill, the combination with a drag-bar, of a disk, a hanger in which the disk is journaled secured to the drag-bar, said drag-bar being arranged at the concave side of the disk and having its rear integral portion bent upwardly, and a seed-boot arranged at the other side of the disk and secured to the upwardly-extending portion of the drag-bar.

18. In a grain-drill, the combination of a concavo-convex disk, a bracket in which the disk is journaled, a drag-bar to which said bracket is secured arranged at the concave side of the disk and having an integral portion thereof bent into the concavity of the disk and having also its rear end extended upwardly, and a seed-boot on the convex side of the disk and secured to the rear end of the drag-bar.

FRANK E. DAVIS.

Witnesses:
C. W. DICKINSON,
C. F. SUTOR.